United States Patent Office
3,067,160
Patented Dec. 4, 1962

3,067,160
PROCESS FOR PREPARING HIGH SOLIDS AMINO-PLAST RESIN ACID COLLOIDS AND RESULTING PRODUCT
William Julius Van Loo, Jr., Middlesex, N.J., assignor to American Cyanamid Company, New York, N.Y., a corporation of Maine
No Drawing. Filed Apr. 23, 1958, Ser. No. 730,244
3 Claims. (Cl. 260—29.4)

The present invention relates to acid colloids of aminoplast resinous materials of the type employable in the finishing of textiles in the making of wet strength paper and in the treatment of leather. More particularly, the present invention relates to a novel process for preparing stable, aqueous dispersions containing high resin solids content which are capable of being readily and rapidly converted to acid colloid solutions.

In the preparation of acid colloids of aminoplast resins, and more particularly acid colloids of melamine resins heretofore, as for example, in accordance with U.S. Patent Nos. 2,345,543, 2,609,307 and 2,661,313, acidic aqueous colloids having a solids concentration of between about 5 and 15% are described, as is their method of preparation. Colloids of the type described in the above-referred to references are possessed of very limited stability, as for example, a maximum of about 1 to 2 months. Most frequently, such colloids are only stable for about 1 to 2 weeks, especially at the higher concentration.

Because of this limitation with respect to stability, these colloids, of practical necessity, must be prepared at the situs of use. Thus, for example, when employed in the treatment of textile materials, as for example, on wool, for the purpose of improving the resistance to felting and shrinkage characteristics of such material, the coilloid must be prepared at the finishing mill and used substantially immediately.

A second principal limitation inherent in such a procedure is that many potential finishing mills are not equipped, either with respect to equipment or space, for the preparation of such colloid materials, since normally a waiting time of 24 hours or more is required for the colloid to develop after the various ingredients have been added. The result is that the amount of such colloids used is not as large as might be expected.

Thus, if a manufacturer were able to prepare either stable acid colloids or stable dispersions capable of being readily converted to colloid materials, the user's need to continually prepare small batches or batches limited in size by the available equipment which can be tied up for 24 hours, to be utilized substantially immediately, would be utilized substantially immediately, would be overcome.

A further difficulty with the present procedures has been that even if a manufacturer were able to prepare stable colloids having from 5–15% solids, the shipment of such low solids concentration materials is economically unattractive.

On the other hand, if the user had a high solids dispersion capable of being immediately converted to an acid colloid, the convenience, savings in time, storage facilities, and more efficient use of equipment and increased use of colloids would result.

Accordingly, it is an object of the present invention to prepare a high solids, stable aqueous dispersion which is capable of being readily converted into a stable acid colloid.

It is a further object of the present invention to provide such a dispersion by a relatively simple and inexpensive procedure.

It is a further object of this invention to provide such a dispersion which, prior to use, has a substantially higher solids concentration than known prior art acid colloids, and is characterized, when converted into suitable acid colloid form, by properties and performance comparable to prior art low solids colloids.

These and other objects and advantages of this invention will become more apparent from the following description set forth hereinbelow.

In accordance with the present invention, a process is provided for preparing a high solids stable aqueous dispersion of aminoplast resin capable of being readily converted into an aminoplast acid colloid. In accordance with this process, a conventional aminoplast acid colloid containing up to 15% solids is prepared in an aqueous solution. To this acid colloid there is added an amount of non-colloidal, preferably water-soluble aminoplast resin in an amount sufficient to provide a dispersion having a total resin solids content of up to 50%. This dispersion is then neutralized to render it stable, as by employing suitable alkaline agents, to a pH above 8 and preferably above 9.

The intermediate product is characterized by substantial stability, i.e. a stability on the order of some 3 to 6 months at 25° C.

By the term "stable" as it is employed herein, when referring to the intermediate product of this invention, it is intended to mean a dispersion characterized by freedom from gelling for at least three months at 25° C.

Thereafter, whenever it is desired within the limits of stability for a particular high solids aqueous dispersion, it may be readily and easily converted into an acid colloid by the addition of a suitable acid. Upon the addition of such an acid, the composition reverts substantially immediately to colloidal form and performs in use as the colloids heretofore known in the prior art.

By the expression "capable of being readily converted" as it and similar expressions are employed herein, it is meant, in general, that the intermediate neutralized, stable aqueous dispersion may be converted to an acid colloid by the addition of a suitable acid and in suitable amounts in time periods substantially less than that normally required for the formation of acid colloids at room temperature. Thus, for example, in the normal preparation of a 5 to 15% acid colloid, periods of time for the formation of the colloid vary to some extent with the amount of acid and temperature employed, and generally require 24 hours at the preferred temperature of preparation, 25° C. However, with regard to these variables, an acid colloid may not be prepared in less than 4 to 8 hours. Specifically, in accordance with this invention, the expression "capable of being readily converted" should be understood to mean that the intermediate stable aqueous dispersion may be converted in times from a few minutes up to 5 minutes to an acid colloid.

The initial aminoplast acid colloid described herein and having a solids content of 5 to 15% may be prepared in accordance with any of a number of known procedures, as for example, those described in U.S. Patents Nos. 2,-345,543, 2,661,313 and 2,609,307. In general, the techniques known and described in these references involve the preparation of an aqueous solution of a substantially monomeric aminoplast material, as for example, a melamine-formaldehyde condensate, and adding thereto amounts of acid to convert the melamine condensate to its colloidal form. The specific details for such preparations may be obtained form any of the above references, and will be illustrated in the following examples.

By "aminoplast" as that term is used herein, it is intended to include melamine-formaldehyde reaction products and their alkylated derivatives, as for example, melamine being reacted with formaldehyde in amounts sufficient to combine from between 1 and 6 moles of formaldehyde and being further reacted with a saturated aliphatic monohydric alcohol containing from 1 to 4 carbon atoms, but preferably methanol in an amount sufficient to combine from between 1 and 6 moles of said alcohol. Thus, for example, trimethylol melamine, dimethyl trimethylol melamine, trimethyl trimethylol melamine, trimethyl pentamethylol melamine and hexamethyl hexamethylol melamine, as well as other variations within the purview of the above description may be employed. It should be noted that the melamine-formaldehyde condensate need not be alkylated (see the above patent references). In addition to the melamine-formaldehyde aminoplast materials, which as a class are preferred, the urea-formaldehyde condensates and their alkylated derivatives may be employed in combination with the melamine-formaldehyde condensates.

The acids employable to make the colloid in the first instances, as well as the acid employed to regenerate the stable dispersion to a high solids acid colloid, are preferably saturated aliphatic monocarboxylic acids having a dissociation constant of about $1.3 \times 10^{-5}$ or greater, and water solubilities of at least 10%. As illustrative of such acids, formic, acetic, propionic, butyric, isobutyric, gluconic, glycolic and lactic may be cited as exemplary. Acids of the type hereinabove identified are particularly desirable when the final acid colloidal product is to be employed in the treatment of textile materials, as for example, wool. This is true in that in the application of these colloids to textile materials, these weaker acids provide a less degrading effect on the textile materials, as compared with certain of the stronger inorganic acids, such as hydrochloric, sulfuric, phosphoric, and the like. It should be noted, however, that these and other inorganic acids may be employed with similar success and are frequently employed where the final colloid material is to be used in areas other than textile finishing, as for example, in the preparation of colloids for use in wet strength paper.

It is generally preferred, as noted hereinabove, that the acid employed in the preparation of the initial colloid as well as in the regeneration of the stable aqueous dispersion be identical, in order that a product of good uniformity be prepared. However, it should be noted that the acids employed in the preparation of the initial colloid and in the regeneration need not be identical, but may be different. Thus, for example, acetic acid, lactic acid, or an inorganic acid such as hydrochloric may be employed in the preparation of the initial acid colloid and an inorganic acid or another organic acid, as for example, glycolic, may be employed in the regeneration or conversion of the stable dispersion to a colloid.

In the preparation of the initial acid colloid, the acid is employed in a mole ratio with respect to the aminoplast in an amount of from between 0.1 and 6 to 1, respectively.

The amount of addition resin which may be charged to the initially prepared 5 to 15% solids colloid solution may be an amount sufficient to provide up to 50% solids in the stable aqueous dispersion. Normally, but not required, the additional aminoplast resin charged to the acid colloid should be identical with the aminoplast material employed in the preparation of the initial colloid. Thus, for example, if the initial 5 to 15% acid colloid was prepared with the trimethoxy trimethylol melamine, the resin employed to fortify said initial colloid is preferably also a trimethoxy trimethylol melamine, for uniformity of product.

After the addition or fortification of the initial acid colloid, the resulting composition should be neutralized or rendered alkaline to a pH above 8, substantially immediately, in order to prevent de-peptization of the already-formed colloid materials. Neutralization may be carried out by the addition of aqueous ammonia, sodium hydroxide, potassium hydroxide, tetramethanol ammonium hydroxide, diethylamine, and other alkaline materials capable of carrying the pH of the resulting composition up to at least 8 and preferably at least 9, to achieve the desired and necessary alkalinity for stability and final dispersion solids.

In order to convert the stable, aqueous dispersion back into a colloidal condition, it is necessary when ready for use to add an additional charge of acid, as noted hereinabove, preferably of the same acid employed in the preparation of the initial colloid. In most instances, this addition may be carried out at room temperature, 25° C. The acid added is normally an amount sufficient or equivalent to that required to obtain a pH of about 3, that of the normal acid colloid. The amount of acid used is generally stoichiometrically equivalent to the alkali added in neutralization. This acidification or regeneration of the stable, aqueous dispersion into a true acid colloid normally requires but a few minutes.

It is not known exactly why the process of the present invention operates to permit the ready formation of acid colloids from high solids dispersions, but it is believed that in the neutralized stable aqueous dispersion, the acid colloid component forms a multiplicity of nuclei which function to cause the added resin charge to begin to polymerize and become partially characterized as colloidal. Upon the addition of the second acid, the polymerization is rapidly carried to completion and the final colloid is formed. Because of the uncertainty of this theoretical consideration, applicant does not wish to be bound thereby.

In order to illustrate the present invention, the following examples are set forth primarily by way of illustration. No details set forth therein should be construed as limitations on the present invention, except as they appear in the appended claims. All parts and percentages are by weight unless otherwise indicated.

EXAMPLE 1

The melamine-formaldehyde condensates and acids identified in Table I hereinbelow were mixed together and sufficient water added to make 1000 parts total. These solutions contained 10% resin solids. The mixing was carried out at a temperature of 130° F. In the procedures identified at Nos. 5 and 6, 2 parts of Aerosol NI Conc., a non-ionic surface active agent prepared by reacting 1 mole of nonyl phenol and 9.5 moles of ethylene oxide, was required to place the particular melamine condensate into solution. The preparations were allowed to stand for 24 hours, until converted to acid colloids and characterized by a blue haze or Tyndall effect associated with acid colloids.

A summary of the preparation and content of the individual colloid solutions is set forth in Table I hereinbelow.

*Table I*

|  | 1 | 2 | 3 | 4 | 5 | 6 | 7 | 8 | 9 |
|---|---|---|---|---|---|---|---|---|---|
| Trimethyl trimethylol melamine (80% solids) | 125 | 125 |  |  |  |  | 125 |  |  |
| Trimethyl pentamethylol melamine-methylated urea-formaldehyde (80% solids) (1:1 molar mixture) |  |  | 125 | 125 |  |  |  | 125 |  |
| Water-dispersible hexamethyl hexamethylol melamine 100% |  |  |  |  | 100 | 100 |  |  | 100 |
| Acetic acid (glacial) | 74.8 |  | 39.9 |  | 46.2 |  |  |  |  |
| Lactic acid (80%) |  | 138 |  | 75 |  | 87.5 | 40 | 40 | 40 |
| Aerosol NI Conc. |  |  |  |  | 2 | 2 |  |  |  |

EXAMPLE 2

Additional amounts of the melamine-formaldehyde condensates employed in the preparation of the 10% colloids of preceding Example 1 were added in sufficient amount to portions of the original preparations so that the final melamine resin solids concentration was 20%.

After the addition of the melamine condensate to the particular samples, aqueous ammonia was added in small increments with continuous stirring until a pH above 8 was obtained. Thereafter, sufficient water was added to make a total of 400 parts for each of the samples prepared. These aqueous dispersions were lettered A through I and correspond to original preparations 1 through 9, respectively, of Example 1. When water solutions of acid were added, colloids were formed having substantially the characteristics of the original colloids. (See Example 3.)

A summary of the preparation of these 400-part samples is set forth in Table II hereinbelow.

*Table II*

|   | A | B | C | D | E | F | G | H | I |
|---|---|---|---|---|---|---|---|---|---|
| 1 | 200 | | | | | | | | |
| 2 | | 200 | | | | | | | |
| 3 | | | 200 | | | | | | |
| 4 | | | | 200 | | | | | |
| 5 | | | | | 200 | | | | |
| 6 | | | | | | 200 | | | |
| 7 | | | | | | | 200 | | |
| 8 | | | | | | | | 200 | |
| 9 | | | | | | | | | 200 |
| Trimethyl trimethylol melamine (80% solids) | 75 | | | 75 | | | 75 | | |
| Trimethyl pentamethylol melamine-methylated urea-formaldehyde (80% solids) | | 75 | | | 75 | | | 75 | |
| Water dispersible hexamethyl hexamethylol melamine 100% | | | 60 | | | 60 | | | 60 |

EXAMPLE 3

Some of the original acid colloids prepared in accordance with Example 1 and some of the high solids dispersions of Example 2, diluted to 10% solids with aqueous solutions of the same acid used in preparing the original colloid, were applied to 9 x 23" pieces of wool samples pre-treated with hydrogen peroxide in accordance with standard procedure. The treated wool samples were framed to size and dried at 250° F. for 10 minutes. The colloids were applied to the fabric two days after the preparation of the original colloids and one day after the preparation of the high solids dispersions. The regenerated colloid was formed in a few minutes and applied within two hours. The results of these applications were recorded in Table III hereinbelow.

*Table III*

| Colloid No. | Parts | Acid kind | Parts | Water | Pick-up, percent |
|---|---|---|---|---|---|
| 1 | 200 | | | | 93 |
| 2 | 200 | | | | 98 |
| 3 | 200 | | | | 96 |
| 4 | 200 | | | | 97 |
| 5 | 200 | | | | 83 |
| 6 | 200 | | | | 82 |
| 7 | 200 | | | | 102 |
| 8 | 200 | | | | 93 |
| 9 | 200 | | | | 93 |
| A | 100 | Acetic [1] | 100 | | 110 |
| B | 100 | do.[1] | 50 | 50 | 92 |
| C | 100 | do.[1] | 50 | 50 | 90 |
| D | 100 | Lactic [2] | 100 | | 107 |
| E | 100 | do.[2] | 50 | 50 | 104 |
| F | 100 | do.[2] | 50 | 50 | 92 |
| G | 100 | do.[2] | 100 | | 102 |
| H | 100 | do.[2] | 50 | 50 | 98 |
| I | 100 | do.[2] | 50 | 50 | 97 |

[1] Glacial.  [2] 80%.

The properties of the treated wool fabric are summarized in Table IV hereinbelow. The washing referred to therein was done by a standard wool wash test employing 0.25% soap and a temperature of 100° F. for 15 minutes.

*Table IV*

| Colloid No. | Original colloid | Hand [a] | | | Color [b] | | | Warp shrinkage, percent | |
|---|---|---|---|---|---|---|---|---|---|
| | | Initial | 1 wash | 5 washes | Initial | 1 wash | 5 washes | 1 wash | 5 washes |
| 1 | | 5 | 5 | 6 | 1 | 1 | 1 | 0.6 | 0.8 |
| 3 | | 5 | 6 | 7 | 1 | 1 | 1 | 0.3 | 0.6 |
| 5 | | 5 | 6 | 6 | 1 | 1 | 1 | 0.6 | 0.6 |
| 7 | | 2 | 4 | 5 | 1 | 1 | 1 | 0.0 | 0.3 |
| 9 | | 5 | 6 | 6 | 1 | 1 | 1 | 0.6 | 0.3 |
| D | 2 | 1 | 5 | 6 | 3 | 3 | 2 | 0.0 | 0.3 |
| E | 4 | 2 | 6 | 7 | 4 | 4 | 4 | 0.0 | 0.3 |
| F | 6 | 5 | 7 | 8 | 3 | 3 | 2 | 1.1 | 2.5 |
| H | 8 | 2 | 6 | 6 | 3 | 3 | 1 | 1.1 | 1.4 |
| Untreated | | 7 | 7 | 7 | 1 | 1 | 1 | 12.2 | 29.4 |

[a] 1=extra stiff; 2=stiff; 3=slightly stiff; 4=extra firm; 5=firm; 6=slightly firm; 7=soft; 8=very soft.
[b] 1=very slightly yellow; 2=slightly yellow; 3=yellow; 4=very yellow.

It is apparent from Table IV hereinabove that the colloids prepared from the high solids dispersions according to the present process perform in substantially the same manner as colloids prepared in accordance with conventional procedures.

EXAMPLE 4

The acid colloids shown in Table V were prepared by the general procedure set forth in Example 1. These colloids were adjusted to a total of 3000 parts with water.

Table V

|  | 10 | 11 | 12 | 13 | 14 | 15 |
|---|---|---|---|---|---|---|
| Trimethyl trimethulol melamine (80% solids) | 375 |  | 375 |  | 375 |  |
| Methylated methylol melamine and urea-formaldehyde resin (80% solids) |  | 375 |  | 375 |  | 375 |
| Acetic acid (glacial) | 225 | 225 |  |  |  |  |
| Lactic acid |  |  | 120 | 120 | 225 | 225 |

EXAMPLE 5

A portion (900 parts) of 1 each of colloids 10–15 above was treated on their day of preparation with 337.5 parts of the resin employed in the preparation of the original colloid and the resulting mixture was thereafter neutralized with 360 parts of a 10% aqueous ammonia solution. Sufficient water was then added to provide a 20% resin solids dispersion of a total of 1800 parts for each of the samples.

EXAMPLE 6

Separate portions of some of the acid colloids prepared as in Example 4 were also converted into dispersions containing 20% solids with the aid of a non-ionic dispersing agent identified hereinabove as Aerosol NI Conc.

Table VI hereinbelow describes these preparations. Mixture B was added to Mixture A in each case. The resulting dispersions became colloidal again when they were acidified.

Table VI

MIXTURE A

| Acid colloid No | 16 | 17 | 18 |
|---|---|---|---|
| Acid colloid amount | 300 | 200 | 200 |
| Methylated methylol melamine and urea-formaldehyde resin (80% solids) | 112 |  | 75 |
| Trimethyl trimethylol melamine (80% solids) |  | 75 |  |
| Water |  | 56 |  |

MIXTURE B

|  | 16 | 17 | 18 |
|---|---|---|---|
| 10% aqueous NH³ | 120 | 80 | 80 |
| Aerosol NI (100%) | 12 | 8 | 8 |
| Water |  | 37 | 37 |

EXAMPLE 7

Acid colloids illustrated in Table VII hereinbelow were prepared in accordance with the general procedure of Example 1. The compositions of these colloids are illustrated in Table VII.

Table VII

|  | 19 | 20 |
|---|---|---|
| Trimethyl trimethylol melamine | 125 | 125 |
| Acetic acid (glacial) | 74 | 74 |
| Aerosol NI (100%) |  | 5 |
| Water to total of | 1,000 | 1,000 |

Preparations similar to those illustrated in Table VII employing polyvinyl alcohol were unstable and gelled on standing overnight.

EXAMPLE 8

200 grams of a 10% acetic acid colloid of the dimethyl ether of trimethylol melamine was prepared in accordance with the general procedure outline in Example 1 hereinabove. 209 grams of the dimethyl ether of trimethylol melamine (80% solids) was then charged to the initial acid colloid and 91 grams of a 28% ammonium hydroxide solution was added to the dispersion to adjust the pH value thereof to above 8.

The aqueous dispersion, containing about 37½% solids, was stored for a period of about three months at 25° C. and found to be stable. When regenerated by the addition of acetic acid, the resulting colloid product gave effective shrinkage control when applied to wool.

As will be noted, various non-ionic wetting agents may be employed to insure proper initial colloid formation. When employed, it is usually preferred that they be employed in amounts from between 0.1 and 1.0%, based on the total weight of the composition. In addition to Aerosol NI, identified hereinabove, examples of other suitable non-ionic agents include Triton X–100, an alkylarylpolyether alcohol, as well as other polyether alcohols and other non-ionic agents.

I claim:

1. A process for preparing a high-solids melamine-formaldehyde acid colloid which comprises (1) preparing a melamine resin acid colloid having a 5–15 percent solids content of a resin selected from the group consisting of melamine-formaldehyde and mixtures of melamine-formaldehyde and urea-formaldehyde resins in colloidal aqueous solution, (2) admixing with said colloid an amount of a soluble noncolloidal material selected from the group consisting of melamine-formaldehyde condensates, alkylated melamine-formaldehyde condensates and mixtures thereof with urea-formaldehyde condensates sufficient to provide a composition having a total resin solids content of up to 50 percent, (3) neutralizing said composition substantially immediately to a pH above about 8, and thereafter (4) adding acid to convert the entire mixture to an acid colloid in not more than a few minutes at room temperature.

2. A process according to claim 1 in which the acid of step (1) is a saturated aliphatic monocarboxylic acid having a dissociation constant of at least $1.3 \times 10^{-5}$ and a water solubility of at least about 10%.

3. A product produced by the process of claim 1.

References Cited in the file of this patent

UNITED STATES PATENTS

| | | |
|---|---|---|
| 2,345,543 | Wohnsiedler et al. | Mar. 28, 1944 |
| 2,564,925 | Pollard | Aug. 21, 1951 |
| 2,609,307 | Fluck et al. | Sept. 2, 1952 |
| 2,661,313 | Folkers | Dec. 1, 1953 |
| 2,708,644 | Dixon | May 17, 1955 |
| 2,797,206 | Suen et al. | June 25, 1957 |
| 2,884,395 | Wohnsiedler | Apr. 28, 1959 |

OTHER REFERENCES

Morrell et al.: "Synthetic Resins and Allied Plastics," Oxford University Press (1951) (chapter IV, esp. p. 187).

Richardson et al.: "Fundamentals of Plastics," McGraw-Hill Book Company (1946) (chapter V, esp. pages 65–66).